INVENTOR
Herbert M. Reed &
Gary D. Johnson
BY Fidelman & Wolffe
ATTORNEY

INVENTOR
Herbert M. Reed &
Gary D. Johnson
BY Fidelman & Wolffe
ATTORNEY

INVENTOR
Herbert M. Reed &
Gary D. Johnson
BY Fidelman & Wolffe
ATTORNEY

United States Patent Office 3,383,011

Patented May 14, 1968

3,383,011

DYNAMIC MEMORY CONTROLLED DISPENSER

Herbert M. Reed, Port Crane, and Gary D. Johnson, Newark Valley, N.Y., assignors to Universal Instruments Corporation, Binghamton, N.Y., a corporation of New York Filed June 16, 1966, Ser. No. 558,072
13 Claims. (Cl. 221—2)

ABSTRACT OF THE DISCLOSURE

Disclosed is a system for dispensing articles from a plurality of bins onto a conveyor in response to data stored on a dynamic, punch tape memory, moved in synchronism with the conveyor. A plurality of read-out means, equal in number to the number of bins, compares data on the memory with stored signals indactive of what bin is to be unloaded. An auxiliary feature relates to checking whether components have been properly dispensed onto the conveyor, as determined by a further read-out means for the tape in combination with an article sensor on the conveyor. Another feature relates to initiating the start of each dispensing cycle by providing a start track on the tape.

The present invention relates generally to dispensing systems and more particularly to a system for feeding articles from a plurality of dispensing stations to a conveyor under the control of a dynamic memory operated synchronously with the conveyor.

In certain manufacturing techniques, each of a plurality of dispensing stations selectively loads a different component or article onto a moving conveyor. At each station, the component is fed to the conveyor which ultimately delivers the components to an assembly device. An example of such a system, relating to taping a plurality of differfent electronic components together in a predetermined order, is disclosed in the copending application of Albert W. Zemek, filed Dec. 20, 1965, Ser. No. 514,963, for "Component Sequencing and Taping Machine," which application has a common assignee with the present application.

According to the present invention, components are fed from the dispensing stations under the control of a dynamic memory, e.g., a punched paper tape, that is translated synchronously with the conveyor. The memory includes a plurality of dispensing instruction frames or locations that move sequentially past read-out means arranged so that a plurality of frames is simultaneously sampled. For each sampled frame, a comparison is made between the information from the dynamic memory and a stored response indicative of the memory designation required to feed a component from a partciular dispenser to the conveyor. Because different frames of the memory are simultaneously read out, a plurality of different components at, what can be considered as parallel dispensing stations, may be selectively loaded onto the conveyor at the same time. The synchronous relationship between the memory and conveyor, as well as the use, per se, of a dynamic memory enables components to be fed in any order or sequence to the conveyor with no effect on the conveyor speed. Hence, the conveyor velocity can be constant or variable in a random manner without adversely affecting the manner in which the components are dispensed onto it.

Another feature of the present invention is that the dispensing sequence always begins at the same location on the memory, regardless of the memory position at the time the system commences operation. Repeatability of the starting sequence is attained by providing a track additional to the dispensing instruction tracks, on the memory. At a specific location on the additional track, a signal is provided for causing the system to start. Prior to the start memory location going past the readout means, no components are loaded onto the conveyor. As the start indicia goes past each of the read-out locations, the dispensers are sequentially enabled but are not energized until a frame of the memory with a dispensing instruction for the particular read-out means has been sampled. Because of the arrangement employed there are no requirements concerning manipulation of the dispensers during initial start-up and any of the dispensers can be the first to be energized.

A further feature of the invention concerns checking to determine if a component has been erroneously deposited on the conveyor or if a component that should have been loaded onto the conveyor has not been fed to it. Checking is accompolished by placing a component sensing device, such as a microswitch, downstream of the last dispensing station, whereby a signal is derived for each component on the conveyor. Simultaneously with the microswitch activation, a head of the read-out means, different from those heads employed for controlling the dispensers, samples the dynamic memory to determine if any component should have been dispensed at the conveyor location where the microswitch is positioned. The microswitch and read-out indications are compared, and if different, an alarm is energized and the conveyor and memory are stopped.

It is accordingly, an object of the present invention to provide a new and improved system for controlling the dispensing of articles from a plurality of stations onto a moving conveyor.

Another object of the present invention is to provide a system for dispensing articles from a plurality of stations onto a conveyor in response to data stored in a dynamic memory advanced synchronously with the conveyor.

An additional object of the present invention is to provide a new and improved system for loading a conveyor from a plurality of dispensing stations which can, if desired, be simultaneously activated.

A further object of the present invention is to provide a system of plural dispensers for loading a moving conveyor, wherein the physical location or arrangement of the dispensing stations has no effect on the velocity of the conveyor.

Still another object of the present invention is to provide a new and improved conveyor operating at constant speed regardless of the order in which components are loaded thereon from a plurality of dispensing stations.

Yet an additional object of the present invention is to provide a new and improved system for dispensing articles from a plurality of stations onto a conveyor, wherein the desired order of components on the conveyor is invariably attained from the beginning and termination of an operating cycle.

Still an additional object of the present invention is to provide a system for dispensing articles onto a conveyor from a plurality of stations in response to read-out of a dynamic memory, wherein components are initially loaded onto the conveyor in the desired order without manipulation of the dispensing stations in response to an influence different from that of the memory.

A further object of the present invention is to provide a new and improved system for dispensing articles onto a conveyor, wherein a check is made to determine if a component has been properly loaded onto the conveyor.

An additional object of the present invention is to provide a dispensing system wherein a check is made to determine if a component has been properly loaded onto a conveyor by comparing data stored on a dynamic memory with a physical indication of the presence of a component on the conveyor.

Still another object of the present invention is to provide a system for dispensing articles from a plurality of stations onto a conveyor under the control of a dynamic memory synchronously advanced with the movement of the conveyor, wherein the memory is utilized in conjunction with an indication of the presence of a component on the conveyor to signal if a component has been properly loaded onto the conveyor.

The above and still further objects, features and advantages of the present invention will become apparent upon consideration of the following detailed description of one specific embodiment thereof, especially when taken in conjunction with the accompanying drawings, wherein.

Figure 1:
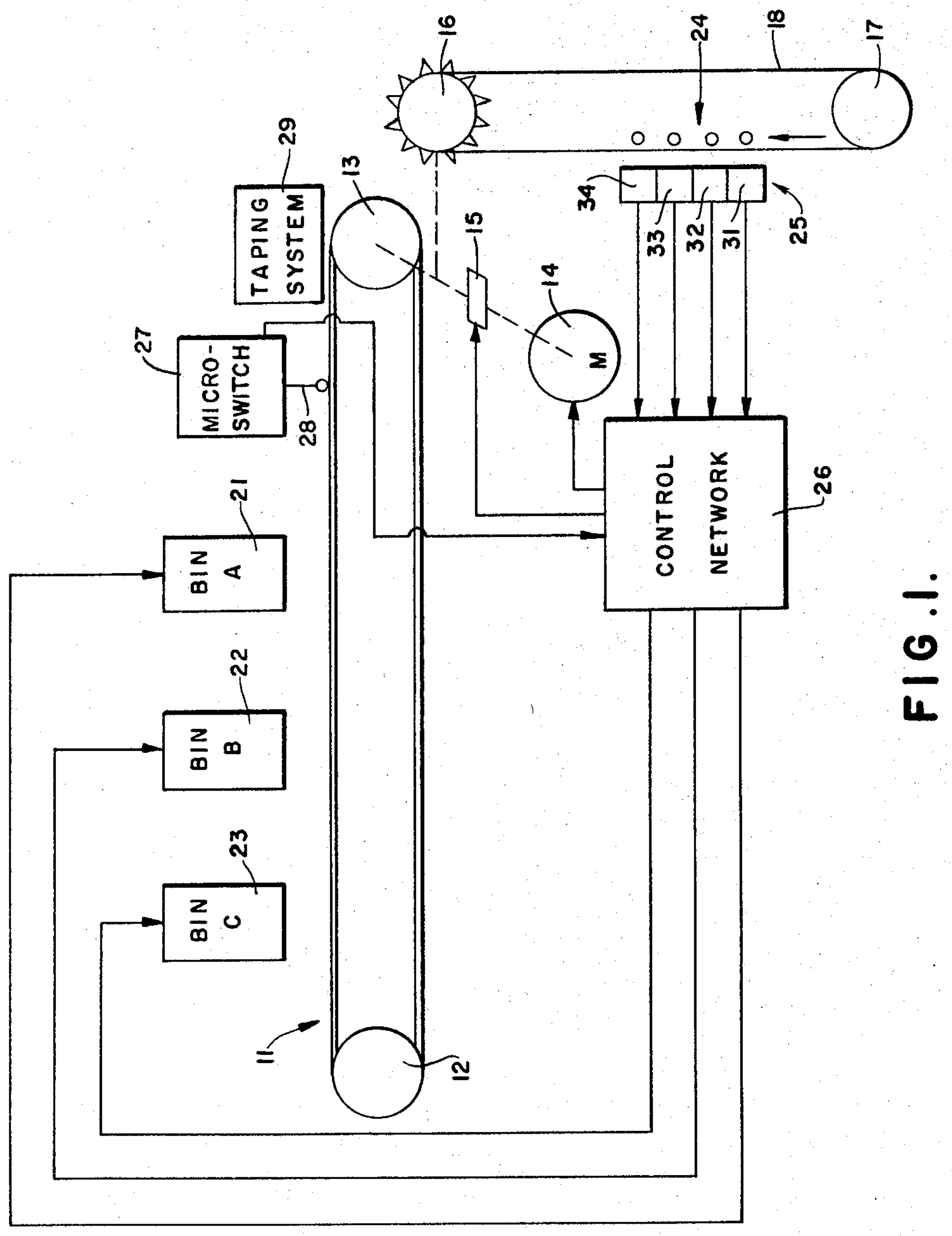
FIGURE 1 is a schematic diagram of an embodiment of the present invention.

Reference is now made to the schematic diagram, FIGURE 1, wherein conveyor belt 11 extends about idler wheel 12 and driven wheel 13. Wheel 13 is driven by the output shaft of motor 14 selectively through the coupling provided by electro-mechanical clutch 15 which also drives wheel 16. Alternatively wheel 16 may be electronically actuated by a timing signal from the conveyor system. Extending about driven wheel 16 and idler wheel 17 is endless dynamic memory 18, in a preferred embodiment a multi-channel punched paper tape.

The indicia stored on paper tape 18 is utilized for controlling the dispensing of components from bins 21, 22 and 23, located longitudinally along conveyor 11, onto the conveyor. Each of the bins 21–23 has stored therein a plurality of different components; in one typical arrangement the components are electrical resistors and capacitors. For example, bin 21 stores a multiplicity of 500 ohm resistors, bin 22 has loaded in it capacitors having a value of 1,000 picofarads, while bin 23 is provided with resistors having a value of 4200 ohms. Indicating holes across the width of paper tape 18 are utilized for selectively passing light from lamp array 24 to photocell array 25 that feeds the detected signals it generates to control network 26. In response to the signals supplied to control network 26 by photocell array 25, signals are supplied to bins 21–23 for selectively controlling the application of components onto conveyor 11.

After the components have been dispensed from bins 21–23, they pass over microswitch 27, so that microswitch contacts 28 are closed in response to a component being located on conveyor 11 at the point where the microswitch feeler is positioned. After passing microswitch station 27, the components are delivered by conveyor 11 to an assembly station. In one preferred embodiment, the assembly station is taping system 29, of the type disclosed in the copending Zemek application, to which reference has been previously made.

Bins 21–23 and the feeler of microswitch 27 are equally spaced along conveyor 11. The conveyor movement is adjusted relative to the translation of dynamic memory 18 past the four photocell groups 31–34 comprising array 25 so that a point on the conveyor moves past each of the bins and the microswitch feeler synchronously with a corresponding point on the paper tape moving past the four photocell groups longitudinally spaced along the memory. Hence, as a particular point or frame on paper tape 18 translates past the aligned photocells in group 31, a corresponding point on conveyor 11 moves past bin 23. At the time when the frame being considered has advanced so it is positioned in front of the aligned photocells of group 32, the point on conveyor 11 is translated beneath bin 22. In the manner described, it is believed evident that conveyor 11 is operated synchronously with movement of paper tape 18 and that a one to one correspondence exists between the stations along the conveyor and the read-out heads along the memory.

While the first three photocell read-out groups 31–33 in array 25 are utilized for controlling bins 21–23, the last group 34 of photocells is employed for enabling a check to be made to determine if a component has been properly loaded onto conveyor 11 in response to the indicia on paper tape 18. If paper tape 18 includes indicia for directing any of the bins 21–23 to dispense a component into conveyor 11, a dispense signal is transmitted to one of the photocells in group 34 as the tape translates past photocell group 34. If the system has performed correctly, simultaneously with derivation of a pulse from photocell group 34, microswitch 27 transmits a signal to control network 26. The simultaneous occurrence of signals from microswitch 27 and photocell detector group 34 has no effect on the operation of the control network. If, however, a signal is derived from photocell group 34 and no signal is fed to control network 26 by microswitch 27, or vice versa, the control network generates an alarm and supplies a signal to electromechanical clutch 15 so that the motion of conveyor 11 and memory 18 ceases. Movement of conveyor 11 and paper tape 18 is not reinstituted until the malfunction causing erroneous loading of components onto conveyor 11 has been remedied and a switch in control network 26 energized manually.

Figure 2:
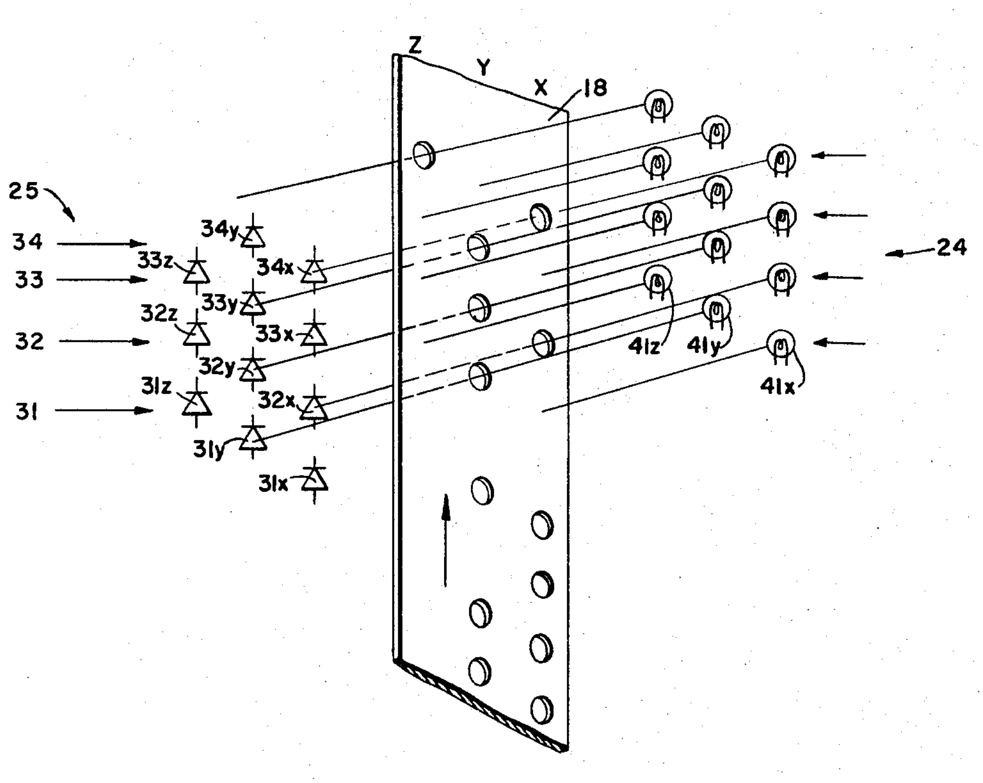
FIGURE 2 is an illustration of the dynamic, paper tape memory of FIGURE 1, together with the read-out means therefor.

FIGURE 2 illustrates more specifically the arrangement of punched tape 18 relative to the multiple frame read-out means comprising lamy array 24 and photocell array 25. For the three bin system of FIGURE 1, four groups of photocells or photodetecting diodes 31–34 are provided, groups 31–33 being provided for controlling bins 21–23, respectively, and group 34 being utilized for checking purposes. Each photocell group includes three photodetecting diodes, which for group 31 are designated as 31*x*, 31*y*, and 31*z*, respectively. Photodecting diodes 31*x*, 31*y* and 31*z* are aligned with lamps 41*x*, 41*y* and 41*z*, respectively, so that light is transmitted from one lamp to one photocell only when an aperture on a corresponding track of tape 18 is located between them.

The apertures across the width of tape 18 are located at positions corresponding with the *x*, *y* and *z* locations of the lamps in array 24 and detectors in array 25. The apertures in tracks *x* and *y* of tape 18 are coded in accordance with Table 1 to control selectively activation of bins 21–23.

TABLE 1

| y | x | BIN |
|---|---|---|
| 0 | 1 | 21 |
| 1 | 0 | 22 |
| 1 | 1 | 23 |
| 0 | 0 | None |

In Table 1, the presence of a 1 indicates that a hole is present in tape 18 while a 0 indicates that no hole is located in the tape. Hence, if bins 21 and 22 are to be activated in sequence, at a first lateral position or frame along tape 18, a hole is provided in the *x* track while no hole is provided in the *y* track and at the next frame along tape 18, the opposite conditions occur, whereby a hole exists in the *y* track but no hole is in the *x* track.

Each of the *x* and *y* photodetectors in detector groups 31, 32 and 33, is respectively connected to a different detection circuit in network 26, which circuits respectively cause dispensing from bins 23, 22 and 21. Each circuit in network 26 is arranged so that it compares the data from one detector group with previously stored values in accordance with Table 1. When the stored value is the same as the value read by the corresponding photocell detector group, the bin associated with the group is energized. For example, the circuit for controlling bin 23 has stored therein the binary signals 1 and 1 for the $x$ and $y$ tracks. Only in response to photocells 31$x$ and 31$y$ receiving light from lamps 41$x$ and 41$y$, is the circuit for bin 23 energized to supply a signal to bin 33 to cause a component to be dispensed.

To indicate more fully the manner in which the system functions, reference is made to Table 2.

TABLE 2

| | | | | | | | | | | | | | |
|---|---|---|---|---|---|---|---|---|---|---|---|---|---|
| $t1$ | A | C | 0 | B | C | B | A | | | | | | |
| $t2$ | | A | C | 0 | B | C | B | A | | | | | |
| $t3$ | | | A | C | 0 | B | C | B | A | | | | |
| $t4$ | | | | A | C | 0 | B | C | B | A | | | |
| $t5$ | | | | | A | C | 0 | B | C | B | A | | |
| $t6$ | | | | | | A | C | 0 | B | C | B | A | |
| $t7$ | | | | | | | A | C | 0 | B | C | B | A |
| | | | | | C | B | A | E | | | | | |
| $t1$ | | | | | C | B | A | | | | | | |
| $t2$ | | | | | 0 | C | B | A | | | | | |
| $t3$ | | | | | 0 | B | C | B | A | | | | |
| $t4$ | | | | | C | 0 | B | C | B | A | | | |
| $t5$ | | | | | 0 | C | 0 | B | C | B | A | | |
| $t6$ | | | | | 0 | 0 | C | 0 | B | C | B | A | |
| $t7$ | | | | | | | A | C | 0 | B | C | B | A |

In Table 2, the upper seven lines indicate the commands on the $x$ and $y$ channels of tape as it moves past detecting array 25 at seven successive time positions, $t1$, $t2$ . . . $t7$. The lower seven lines indicate articles dispensed from bins 21–23 onto conveyor 11 and the position of the articles on the conveyor at each of the time slots $t1$–$t7$. The center line of Table 2 indicates the position of the four detector groups in array 25 relative to the tape and conveyor.

In the first seven lines of Table 2, the presence of the letters A, B and C respectively indicates that the tape has apertures therein to control activation of bins 21, 22 and 23 in accordance with Table 1. A zero is indicative of no hole being located on tape 18, whereby the tape instruction is for no component to be loaded onto the conveyor 11 at the corresponding location. Similarly, the letters A, B, C and the number zero in the last seven lines of Table 2 respectively indicate that components from bins 21, 22 and 23 or no component has been loaded onto conveyor 11. The letters A, B and C in the middle line of Table 2 are indicative of the codes to which the circuits of control network 26 respond to energize bins 21, 22 and 23, respectively while the letter E in the center line corresponds with the detectors in group 34.

Control network 26 includes circuitry, described infra, so that the presence of a hole in either of the $x$ or $y$ tracks of tape 18 as the tape passes photodetector group 34 causes an E signal to be generated. If the signal occurs simultaneously with contacts 28 of microswitch 27 being closed, or if no E signal is derived and contacts 28 are open, the system remains in normal operation. If, however, an E signal is derived and contacts 28 remain open or vice versa, an alarm is generated by control network 26 and electromechanical clutch 15 is decoupled.

The manner in which Table 2 assists in describing the operation of the system is now considered, assuming that the system is in operation and that no errors in dispensing occur, whereby the operation of error checking photodetector group 34 can be ignored. At time $t1$, tape 18 is positioned so that indicia for commanding bins 21, 22 and 23 is positioned in alignment with photodetector groups 33, 32 and 31, respectively. Hence, each of bins 21–23 is simultaneously activated to dispense a different component onto conveyor 11.

At time $t2$, conveyor 11 and tape 18 have advanced so that the indicia on tape 18 presented before photodetector groups 31–33 corresponds with commands for energizing bins 22, 23 and 21 respectively. Since none of the signals generated by groups 31–33 corresponds with the signals stored in control network 26 for the corresponding groups, none of bins 21–23 is activated at time $t2$, and the conveyor is loaded in accordance with the second line in the bottom half of Table 2.

At time $t3$, tape 18 has advanced to the point where photocell groups 31, 32 and 33 receive signals respectively corresponding with dispensing no product, energizing bin 22 and energizing bin 21. In response to these signals, the circuits of control network 26 cause bin 22 to dispense a component onto conveyor 11 while no component is loaded onto the conveyor by bins 21 and 23. Thus, at time $t3$ conveyor 11 is loaded so that no component is beneath bin 23, the component of bin 22 is beneath bin 22, the component of bin 23 is beneath bin 21, the component of bin 22 is passing over the feeler of microswitch 27 and the component of bin 21 is located at an intermediate point between the feeler of microswitch 27 and taping system 29. From Table 2 and the preceding description, the operation of bins 21–23 for loading components onto conveyor 11 in response to the stored indicia on tape 18 and the signals from control network 26 is believed evident.

A feature of the invention is that the system always begins dispensing in the same order, regardless of where tape 18 is located at the end of the previous operating cycle. Repeatability of the starting cycle is attained by utilizing the $z$ track of tape 18. The $z$ track of tape 18 includes only one aperture along its entire length, which aperture is located at a position corresponding with the beginning of the dispensing operation.

Circuitry in control network 26 is arranged so that components cannot be dispensed until after the aperture in the $z$ channel of tape 18 has allowed light from lamp 41$z$ to impinge on photodetecting diode 31$z$. In response to photodetector 31$z$ receiving light from lamp 41$z$, the first stage of a shift register within control network 26 is activated. Activation of the first stage of the shift register enables, but does not cause, bin 23 to dispense components; however, energization of the first shift register stage does not permit either of bins 21 or 22 to be enabled for dispensing purposes.

As tape 18 is advanced so that the aperture in the $z$ channel thereof is translated to permit light to fall on photodetector 32$z$, bin 22 becomes enabled, whereby it can be energized to dispense components onto conveyor 11. By virtue of a holding circuit, bin 23 remains enabled for future dispensing under the control of the indicia on tape 18. Similarly, bin 21 is enabled in response to light impinging on photodetector 33$z$ and each of bins 21 and 22 is latched into an enabled or readied status sequentially.

The shifting and latching circuit of network 26 is arranged so that all of the detectors are simultaneously disabled. In consequence, it is possible to initiate a new dispensing cycle under the control of the same tape with the aperture in the $z$ channel of the tape located immediately before detecting group 31.

Figure 3:
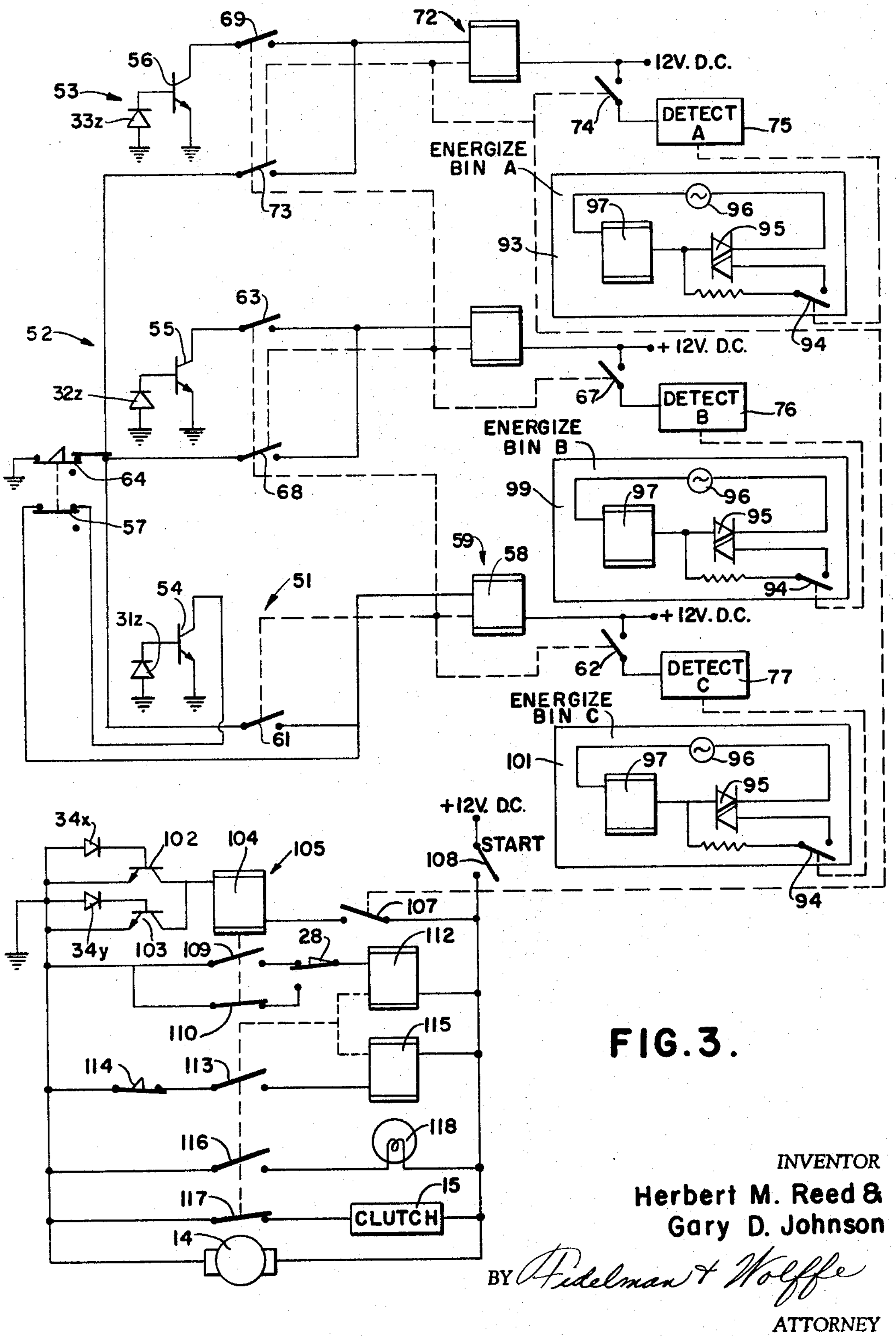
FIGURE 3 is a circuit diagram of the control network of FIGURE 1.

Reference is now made to FIGURE 3 of the drawings, a circuit diagram of control network 26, FIGURE 1. FIGURE 3 includes circuits 51, 52 and 53 for enabling dispensing bins 23, 22 and 21, respectively in sequence. Circuits 51–53 are respectively connected to photodetecting diodes 31$z$–33$z$, sequentially responsive to light transmitted through the aperture in the $z$ channel of tape 18. The anode of each of diodes 31$z$–33$z$ is grounded while the cathode thereof is connected to the base of npn transistors 54–56, respectively. The emitter collector path of transistors 54–56 is normally cut off by virtue of the high impedance back bias path of diodes 31$z$–33$z$. In response to light impinging on one of the diodes 31$z$–33$z$, however, a low impedance exists between the emitter and base of the corresponding transistor and substantial current can flow between the transistor collector and emitter electrodes.

The collector of transistor 54 is connected to normally closed switch contact 57 and coil 58 of relay 59 to a positive 12 volt D.C. source. In response to light impinging on photodetecting diode 31$z$, current flows through the emitter-collector path of transistor 54, energizing coil 58, whereby normally open relay contacts 61–63 are closed.

Closing relay contact 61 establishes a continuous path from the +12 volt D.C. source to ground through normally closed switch contact 64, ganged with contacts 57, and relay coil 58. Thereby, a latching circuit is provided for relay coil 58 and relay 59 remains energized even after light is no longer impinging on photodiode 31z. Relay 59 remains energized as long as contacts 64 are closed, but the relay is deenergized in response to manual opening of ganged contacts 64 and 57.

Energization of relay 58 closes contact 63, whereby the emitter-collector path of transistor 55 can be supplied with current. In response to the aperture in the *z* channel of tape 18 passing photodetecting diode 32z, the base emitter junction of transistor 55 is forward biased and a low impedance path is provided through the transistor to energize coil 65 of relay 66. Energization of relay coil 65 closes normally open relay contacts 67, 68 and 69, whereby a latching circuit is provided for relay coil 65 and transistor 56 of circuit 53 can be enabled. Hence, relay 66 remains energized even after light is no longer impinging on photodiode 32z and the passage of the aperture in the *z* channel of tape 18 causes energization of coil 71 of relay 72. Energization of coil 71 closes normally open contacts 73 and 74 so that the relay coil of circuit 53 is latched.

Opening manually activated switch contact 64 simultaneously open circuits the latching path for each of relays 59, 66 and 72, whereby each of circuits 51–53 is simultaneously rendered inoperative.

As each of relay contacts 62, 67 and 74 is sequentially energized, power supply voltage is fed to detecting networks 75, 76 and 77 for respectively controlling dispensing of components from bins 21, 22 and 23. Since each of detecting networks 75–77 has substantially the same configuration, a description of network 77 will suffice for all three.

Figure 4:
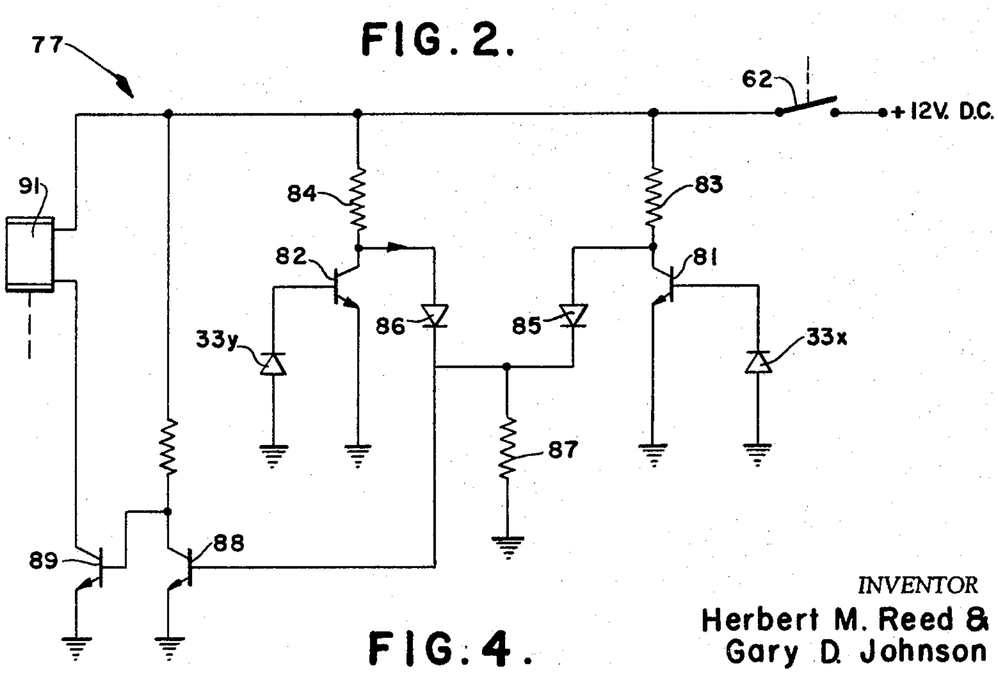
FIGURE 4 is a circuit diagram of a typical detecting circuit utilized in FIGURE 3.

A circuit diagram of detecting network 77 that controls dispensing of components from bin 23 is shown in FIGURE 4. The base emitter junctions of npn transistors 81 and 82 are normally back biased by their shunt connection with the anode cathode paths of diodes 33x and 33y, respectively. The collectors of transistors 81 and 82 are selectively connected through normally open relay contact 62, included in relay 59, FIGURE 3, and load resistors 83 and 84 to the same +12 volt D.C. supply that energizes relay coil 58. In response to energization of coil 58 of relay 59, contacts 62 are closed, whereby the emitter collector paths of transistors 81 and 82 can be rendered conducting in response to light impinging on photodetecting diodes 33x and 33y.

The collectors of transistors 81 and 82 are connected through the anode cathode paths of diodes 85 and 86 to load resistor 87. Diodes 85 and 86, together with resistor 87, form an AND gate that is responsive to the binary signals impinging on photodetecting diodes 33x and 33y. If light impinges on both diodes 33x and 33y, low impedance paths are provided between the emitter and collector of transistors 81 and 82, whereby ground volltage is fed to the anodes of both of diodes 85 and 86. If, however, only one or if neither of transistors 81 or 82 is forward biased because light impinges on only one or on neither of photodetecting diodes 33x or 33y, positive voltage is applied to the anode of one or both of diodes 85 and 86. It is thus seen that ground voltage is developed across load resistor 87 only in response to light impinging on both of photodetecting diodes 33x and 33y.

The voltage across resistor 87 is reversed in phase by npn transistor 88, the collector of which is D.C. coupled to the base of driver transistor 89. Connected between the collector of transistor 89 and contact 62 is coil 91, employed for closing contacts in a network for controlling energization of the dispenser included within bin 23. It is thus seen that coil 91 is energized only in response to closing of relay contacts 62 and light impinging on both of photodetecting diodes 33x and 33y.

Detecting networks 75 and 76 are substantially the same as the illustrated network 77. There is, however, a slight variation between each of the detecting networks since each includes a different stored response. Since detector 76 controls the dispensing action of bin 22, its output relay is energized only in response to light impinging on photodetecting diode 32y. Hence, it is necessary to derive zero voltage across load resistor 87 only when diode 32y has light impinging on it and when photodetecting diode 32x has no light propagated to it. This result is attained by connecting a phase inverting transistor between the collector of transistor 81 and the anode of diode 85 so that ground voltage is supplied to the diode in response to no light impinging on diode 33x. In a similar manner, detecting network 75 includes a transistorized phase inverter between the collector of transistor 82 and the anode of diode 36, so that the voltage across load resistor 87 is zero only in response to photodetecting diode 31x having light impinging thereon.

By conventional means, well known to those skilled in the art, energizing voltage is supplied to the circuits of detectors 75–77 only during the interval when an indicia bearing frame is located between the lamps of array 25 and detectors of array 26. In the interval between reading of information from the tape 18, the possibility of energization of relay coil 91 is thus precluded.

Because there is insufficient current flow through the coil of relay 91 to energize the dispensing mechanism of bias 21–23, the relay energizes the contacts of a power amplifying device. A typical power amplifying device is illustrated in FIGURE 3, as network 93 that is responsive to the activation of relay coil 91 in detector 75. The coil of relay 91 in detector 75 closes contacts 94 in the gate electrode energization network of triac 95. The cathode of triac 95 is connected to one terminal of A.C. source 96, the other terminal of which is connected through solenoid 97 to the anode of triac 95. The anode of triac 95 is also connected through load limiting resistor 98, selectively connected to the gate electrode of the silicon controlled rectifier through relay contacts 94.

Energization of relay 91 in detecting network 75 causes contacts 94 to close, whereby relatively large current flows through energizing solenoid 97 during the half cycle of A.C. source 96 when the anode of triac 95 is positive. In response to energization of solenoid 97, the dispensing mechanism in bin 21 is actuated, to feed a component from the bin onto conveyor 11.

The circuits utilized for energizing the dispensing means or head of bins 22 and 23 are networks 99 and 101, having exactly the same configuration as network 93, but responding to energization of relay coils 91 in detecting networks 76 and 77, respectively.

To enable errors to be determined, photodetecting diodes 34x and 34y are connected in shunt with the emitter base junctions of npn transistors 102 and 103, respectively, to back bias these transistors normally. The emitter collector paths of transistors 102 and 103 are connected in parallel between ground and one terminal of the coil 104 of relay 105, the other terminal of which is selectively connected through the normally open contact 107 of relay 59 to the +12 volt D.C. source. The 12 volt D.C. source is connected to relay contact 107 and the remainder of the circuit illustrated in FIGURE 3 through manually activated start switch 108.

In operation, once the aperture in the *z* channel of tape 18 has gone past photodiode 33z, whereby relay 72 is energized and a component loaded onto conveyor 11 is moving between bin 21 and the feeler of microswitch 27, relay contacts 107 are closed. Closing relay contacts 107 enables coil 104 of relay 105 to be energized if light impinges on either of photodiodes 34x or 34y. Light should impinge, during proper operation of the system, on one of diodes 34x or 34y to energize coil 104. In response to energization of coil 104, normally open contacts 109 and normally closed contacts 110 are closed and opened, respectively. One terminal of each of contacts 109 and 110 is grounded while the other is selectively connected to armature 28 of microswitch 27. The other terminal of microswitch 27 is connected through relay coil 112 to the +12 volt D.C. supply to enable the relay to be selectively activated. Armature 28 of microswitch 27 is positioned and arranged so that when no component is passing the microswitch feeler the armature is connected with contact 109; if, however, a component is sensed by the microswitch feeler, armature 28 is depressed to form a circuit with relay contacts 110.

It should now be evident that relay coil 112 is energized only in response to an error in dispensing from one of bins 21–23. If, for example, bin 21 were instructed to dispense a component onto conveyor 11, light coming through the *x* channel of tape 18 impinges on photodiode 34*x*, causing transistor 102 to be forward biased at the time when the component should be passing by the feeler of microswitch 27. In consequence, contacts 109 are closed and contacts 110 are open circuited at a time when armature 28 engages contacts 110 whereby relay coil 112 remains deenergized. If, however, the article were not dispensed, armature 28 remains connected with closed contact 109 and relay coil 112 is energized. Conversely, if paper tape 18 includes no instruction to dispense and one of the bins 21–23 did dispense, no light impinges on photodetecting diodes 34*x* and 34*y* at the time when armature 28 is connected with contact 110. Since contact 110 is normally closed, current is supplied to coil 112, energizing it to provide an indication of error.

The error indicating network includes normally open circuited latching contacts 113 which are series connected with manually activated switch 114 and relay coil 115. The contacts of relay coils 112 and 115 are the same so that if either relay is energized, the contacts are positioned to their activated status. Hence, activation of relay coil 112 in response to detection of an error causes contacts 113 to be closed, whereby relay coil 115 is energized. Energization of relay coil 115 persists after relay coil 112 is deactivated because of the latching circuit included through contacts 113. Relay coil 115 is deenergized only by manually opening switch 114 after the error in the conveyor system has been remedied. Thereby, removal of an erroneously dropped conveyor from the feeler location of microswitch 27 does not enable the system to be restarted automatically.

Relay coils 112 and 115 separately control normally open and normally closed contacts 116 and 117, respectively. Normally open contact 116 is connected in series circuit with error indicating lamp 118 to cause the lamp to be energized in response to an error being detected and prior to remedial action being taken to rectify the error. Contacts 117 are connected with clutch 15 so that power is normally supplied to the clutch, whereby the output shaft of motor 14 normally turns wheels 13 and 16. In response to either of relay coils 112 or 115 being energized, clutch 15 is disengaged, to stop both of conveyor 11 and punched tape 18 simultaneously. Permanently connected to start switch 108 and ground is motor 14 so that conveyor 11 and record 18 are driven together as soon as start switch 108 is closed.

While we have described and illustrated one specific embodiment of our invention, it will be clear that variations of the details of construction which are specifically illustrated and described may be made without departing from the true spirit and scope of the invention as defined in the appended claims. For example, the number of dispensing stations or bins can be increased considerably above three, the number illustrated. If, for example, N dispensing bins are provided, $(N+1)$ groups of photodetector read-out heads are provided, one head for the error indication and the remaining heads corresponding with each of the bins. Further, the use of the Z track may be reversed by a standard inverted system whereby termination is effected while retaining the sequence integrity.

We claim:

1. A system for dispensing articles from N stations, longitudinally located along a conveyor, in response to indicia stored on a dynamic longitudinally translated memory, where N is greater than one, said indicia being arranged in frames longitudinally located along the memory, the indicia at each of said frames being uniquely related to commands for dispensing components from a different one of said stations, comprising N read-out means longitudinally disposed along said memory, each of said read-out means including means for deriving a dispensing control signal for a different one of said stations in response to the memory indicia being translated past the read-out means corresponding with indicia stored at the read-out means, the read-out means for each station and the stations being positioned along the memory and conveyor in the same order, and means for synchronizing the movements of said conveyor relative to said stations and the said memory relative to said read-out means so that a point on the conveyor moves past each of the stations simultaneously with a corresponding point on the memory moving past each of said read-out means.

2. The system of claim 1 further including: another read-out means, located longitudinally along said memory downstream of the last of said N read-out means, for deriving a signal in response to indicia on the memory representing a command for dispensing a component; means for detecting the presence of a component on the conveyor, said detecting and additional read-out means being located at corresponding points along the conveyor and memory; and means responsive to said detecting means and the signal derived from said another read-out means for deriving a further signal only in response to one, but not both, of (a) activation of said detecting means and (b) the signal from said additional read-out means.

3. The system of claim 2 further including means for latching said further signal, and means for at will delatching said further signal.

4. The system of claim 3 further including means for disabling the drive of said conveyor and memory in response to said further signal.

5. The system of claim 3 further including means for activating an alarm in response to said further signal.

6. The system of claim 1 wherein said memory includes a track separate from the dispensing control indicia, a frame on said track including indicia for initiating start of the dispensing operation, each of said read-out means being responsive sequentially to said start indicia and including means for enabling the dispensing control signal thereof to be derived only after the start indicia has passed by it.

7. The system of claim 6 wherein each of said read-out means includes means for preventing the dispensing control signal thereof from being derived until the enabling means of an adjacent read-out means has been activated.

8. The system of claim 7 further including: additional read-out means located longitudinally along said memory downstream of the last of said N read-out means, for deriving a signal in response to indicia on the memory representing a command for dispensing a component; means for detecting the presence of a component on the conveyor, said detecting and another read-out means being located at corresponding points along the conveyor and memory; and means responsive to said detecting means and the signal deriving from said another read-out means for deriving a further signal only in response to one, but not both, of (a) activation of said detecting means and (b) the signal from said additional read-out means.

9. The system of claim 8 further including means for latching said further signal, and means for at will de-latching said further signal.

10. The system of claim 9 further including means for disabling the drive of said conveyor and memory in response to said further signal.

11. A system for dispensing articles from N stations located along a conveyor in response to indicia stored on a dynamic memory, where N is greater than 1, said indicia being arranged in frames located along the memory in the direction of movement of the memory, the indicia at each frame being uniquely related to commands for dispensing components from a different one of said stations, comprising N read-out means disposed along said memory in the direction of movement of said memory, each of said read-out means including means for deriving a dispensing control signal for a different one of said stations in response to the memory indicia being translated past the read-out means corresponding with indicia stored at the read-out means, and means for synchronizing the movements of the conveyor relative to said stations and said memory relative to said read-out means so that a point on said conveyor moves past each of the stations substantially simultaneously with a corresponding point on the memory moving past each of said read-out means.

12. A system for dispensing articles from N stations located along a conveyor comprising a dynamic memory having indicia stored thereon, said indicia being arranged in frames located along the memory in the direction of movement of the memory, the indicia at each of said frames being uniquely related to commands for dispensing components from a different one of said stations, N read-out means disposed along said memory in the direction of movement of the memory, where N is an integer greater than one, each of said read-out means including means for deriving a dispensing control signal for a different one of said stations in response to the memory indicia being translated past the read-out means corresponding with indicia stored at the read-out means, and means for synchronizing the movements of the conveyor relative to said stations and said memory relative to said read-out means so that a point on said confeyor moves past each of the stations substantially simultaneously with a corresponding point on the memory moving past each of said read-out means.

13. In combination, N article dispensing stations, a conveyor, each of said stations being located at a different point along the conveyor, a dynamic memory, said dynamic memory including stored indicia arranged in frames located along the memory in the direction of movement of the memory, the indicia at each of said frames being uniquely related to commands for dispensing components from a different one of said stations, N read-out means disposed along said memory in the direction of movement of the memory, where N is an integer greater than one, each of said read-out means including means for deriving a dispensing control signal for a different one of said stations in response to the memory indicia being translated past the read-out means, and means for synchronizing the movements of the conveyor relative to said stations and said memory relative to said read-out means so that a point on said conveyor moves past each of the stations substantially simultaneously with a corresponding point on the memory moving past each of said read-out means.

References Cited

UNITED STATES PATENTS

| | | | |
|---|---|---|---|
| 2,590,091 | 3/1952 | Devol | 214—11 |
| 2,717,086 | 9/1955 | Bush | 214—11 |

FOREIGN PATENTS

| | | |
|---|---|---|
| 157,628 | 5/1962 | U.S.S.R. |

ROBERT B. REEVES, *Primary Examiner.*

HADD S. LANE, *Examiner.*